July 22, 1924.
R. N. EHRHART
REDUCTION GEARING
Original Filed Sept. 18, 1918
1,502,239
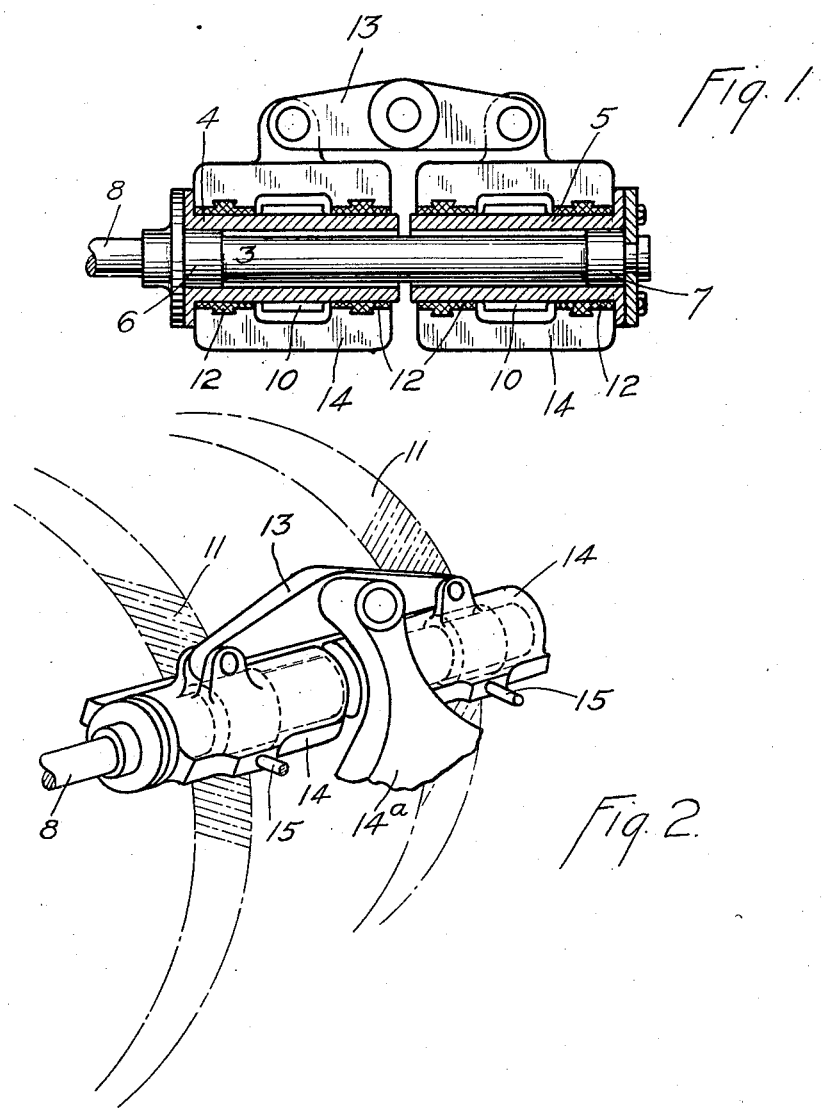

Patented July 22, 1924.

1,502,239

UNITED STATES PATENT OFFICE.

RAYMOND N. EHRHART, OF JEANNETTE, PENNSYLVANIA, ASSIGNOR, BY MESNE ASSIGNMENTS, TO WESTINGHOUSE GEAR AND DYNAMOMETER COMPANY, A CORPORATION OF PENNSYLVANIA.

REDUCTION GEARING.

Application filed September 18, 1918, Serial No. 254,664. Renewed January 16, 1924.

*To all whom it may concern:*

Be it known that I, RAYMOND N. EHRHART, a citizen of the United States, and a resident of Jeannette, in the county of Allegheny and State of Pennsylvania, have made a new and useful Invention in Reduction Gearing, of which the following is a specification.

This invention has for an object to produce such a transmission gearing in which means are employed for compensating for torsional and cross-bending deflection of the pinion and for thereby uniformly distributing the tooth pressure along the faces of the intermeshing teeth of the gears.

Where large powers are to be transmitted it has been found desirable to employ helical teeth on the gears and also to divide the gear teeth of each gear into two sets, each of which is so located and arranged with relation to the other that the longitudinal thrusts occasioned by one set are counteracted or counterbalanced by the longitudinal thrusts occasioned by the other set. Difficulty has been encountered with large gears designed to transmit large powers in that the cross-bending or torsional deflection of the smaller gear (pinion) occasion an unequal distribution of tooth pressure along the faces of the intermeshing teeth. The same difficulty is occasioned by a misalignment of the gears and may of course result from inaccurate spacing or inclination of the gear teeth. Means have been employed for compensating for misalignment of gears and for torsional and cross-bending deflection of the pinion and for thereby uniformly distributing the tooth pressures along the faces of the intermeshing teeth. In this connection I call attention to U. S. Patent No. 946,455 of January 11, 1910, covering the invention of Melville and Macalpine.

An object of my present invention is to produce a reduction gearing in which the compensating means employed permits of relative motion betwen the portions of the pinion carrying the separate sets of teeth so that each set of teeth is capable of a more or less independent and automatic adjustment irrespective of the angular position of the axis of the other set and of the axis of the pinion as a whole. Additional objects will be made apparent by the further description of the apparatus herein illustrated and described as an embodiment of my invention.

In the drawings: Fig. 1 is a sectional view of a pinion embodying the features of my invention; portions of the pinion are shown in elevation for convenience of illustration.

Fig. 2 is a fragmental perspective view of the apparatus shown in Fig. 1 and is illustrated in connection with a diagrammatic disclosure of the large gear with which the pinion meshes.

As illustrated, the pinion is in effect formed in two parts, each of which is journaled in a separate bearing and is operatively connected to the other part by means of a shaft which is sufficiently flexible to permit the two parts to move to different angular positions relatively to each other. Each separate part is provided with one set of gear teeth adapted to mesh with a correspondingly located set of teeth on the main gear of the gearing. The bearings are so mounted that each bearing is capable of moving to an angular position, with relation to the normal position of its longitudinal axis, for the purpose of accommodating the angular motion of the separate parts of the pinion. As illustrated, each bearing is pivotally secured to a lever which in turn is pivotally mounted on a stationary fulcrum intermediate the points of attachment of the two bearings.

Referring to the drawings: As shown, the pinion includes a shaft 3 on which two sleeves or pinion elements 4 and 5 are mounted. As shown, the sleeve 4 is rigidly secured to the shaft 3 at one end only, the shaft being provided with a shoulder 6 for this purpose. The remaining portion of the sleeve surrounds the shaft, but is spaced from it so that it is capable of yielding and consequently assuming angular positions with relation to the axis of the shaft. The sleeve 5 is similarly mounted on a shoulder 7 formed on the other end of the shaft, and it, like the sleeve 4, projects along the shaft with its major portion spaced from the shaft and capable of a slight degree of relative motion with relation to the shaft. In the drawings, the shaft 3 is shown rigidly coupled to a driving shaft 8, but it will be apparent that the shaft 3 may be hollow and that the driving shaft 8 may extend through the hollow interior thereof and be secured to the end thereof in the manner illustrated in said Patent No. 946,455. Each sleeve is provided with a set of helical teeth 10, adapted to mesh with a set of teeth 11 formed on the large gear of the gearing.

Each sleeve or pinion element 4 and 5 is journaled in a pair of bearings 12. Each pair of bearings is mounted in a cage 14 which is illustrated in Figs. 1 and 2, as pivotally secured to a lever 13. The lever 13 is shown fulcrumed at a point midway between its ends on a stationary bracket 14ᵃ which may form a part of the gearing casing. In the drawings the fulcrumed point of the lever 13 is midway between the points of attachment of the bearing cages 14.

With this arrangement the pinion can swing to different angular positions at right angles to the plane defined by the normal positions of the axes of the large gear and pinion. In addition to this, each of the sleeves 4 and 5 is also capable of yielding so that their axes may move to different angular positions with relation to each other and with relation to the axis of the large gear. With this arrangement the compensating effect of the floating bearings is materially increased and consequently the pinion is capable of maintaining uniformity of tooth pressure along the faces of the intermeshing teeth even where the deflection of the pinion or the misalignment of the gears is relatively great.

In Fig. 2, I have shown struts 15 bearing against the cages 14 and adapted to prevent angular motion of the pinion except in a plane at right angles to the plane defined by the normal position of the gear and pinion. These struts 15, like the struts 46 of said Patent No. 946,455 are preferably located between a rigid portion of the gear casing and the cages 14 and they may be provided with any desired means for adjusting the thrusts occasioned by them.

While I have described and illustrated but one embodiment of my invention, it will be apparent to those skilled in the art that various modifications, changes, additions and omissions may be made in the apparatus described and illustrated, without departing from the spirit and scope of the invention, as set forth by the appended claims.

What I claim is:

1. In a reduction gearing, two large gears having oppositely inclined teeth formed thereon, two pinions each having gear teeth meshing with the teeth of one of said gears, an independent movably mounted bearing for each of said pinions, and a shaft connecting the pinions together.

2. In a reduction gearing, two large gears having oppositely inclined teeth formed thereon, two pinions, each having gear teeth adapted to mesh with one of the said gears, an independent movably mounted bearing for each pinion, a shaft connecting said pinions so as to accommodate relative angular motion of the pinions, and a driving connection secured to said shaft.

3. In a reduction gearing, the combination of a pair of gears having oppositely inclined teeth, pinion sleeves having teeth meshing with the teeth of said gears, a shaft extending through said pinion sleeves and connected thereto at the outside ends, each of said sleeves being spaced from the shaft for the major portion of its length, independently tiltable bearings for the pinion sleeves, and equalizing means for supporting the bearings.

4. In combination in a reduction gearing, two gears having oppositely inclined helical teeth, and a gear element comprising a shaft, and two pinions having oppositely inclined helical teeth mounted on said shaft, and independent bearings for said shaft movable to different angular positions relatively to each other.

5. In combination in a transmission gearing, a gear member having two sets of gear teeth, a pinion member comprising a shaft and two pinions mounted thereon and having teeth meshing with said gear teeth, two bearings for supporting the pinion member, and means for supporting the bearings so that the pinions may move or tilt perpendicularly to the plane of the axes of said gear and pinion members to equalize the pressure of tooth engagement and to insure proper engagement of the teeth.

6. In combination in a transmission gearing, a gear having two sets of gear teeth, a pinion comprising a shaft, and a separate sleeve mounted on each end of the shaft and provided with gear teeth meshing with one of the sets of teeth of the gear, each sleeve being secured to the shaft at one end only and projecting longitudinally along but free of the shaft, and relatively movable bearings in which the sleeves are journaled.

7. In combination in a reduction gearing, a gear having two sets of oppositely inclined teeth, a gear element comprising a shaft, two pinion elements each so mounted on the shaft that it is capable of relatively angular motion with relation to the shaft and to the other pinion element mounted on the shaft, and independently movable bearings for each pinion element.

8. A reduction gearing, comprising a gear having two sets of teeth, a shaft, two sets of teeth flexibly mounted on the shaft and capable of angular motion relatively to each other and to the shaft, and bearings for the shaft capable of moving to accommodate axial angular motion of the shaft.

9. A reduction gearing comprising a gear having two sets of teeth, and a gear element comprising two relatively movable pinion elements each having teeth meshing with the teeth of the gear, a shaft on which said pinion elements are flexibly mounted, and a bearing for each pinion element capable of moving to accommodate axial angular motion of the pinion elements.

10. A pinion comprising a shaft, a pair of sleeves secured to the opposite ends of the shaft at one end only and extending along but spaced from the shaft throughout a portion of its length, gear teeth on said sleeves, and a driving element having driving connection with one end of the shaft.

11. In combination in a reduction gearing, a gear, having two sets of gear teeth, a pinion comprising a shaft, and a separate sleeve mounted on each end of the shaft and extending along but spaced from the shaft throughout a portion of its length, each sleeve being provided with teeth meshing with one of the sets of said gear, a separate bearing for each sleeve, and a movable member on which both said bearings are movably mounted.

12. In a reduction gear, the combination of a pair of gear elements, a pair of sleeves having pinion portions meshing therewith, each sleeve adapted to be connected to a driving element at a single end, bearing members for said sleeves, lever means for pivotally supporting and connecting said members for motion in a plane perpendicular to the plane of the axes of the gear and pinion elements, and strut members associated with said members to confine their motion to said perpendicular plane.

13. In a reduction gear, the combination of a pair of gears, a shaft, a plurality of yieldable pinions, each connected at a single end to said shaft, bearings for said pinions, and a pivoted lever to which each of said bearings is pivotally connected.

14. A pinion mechanism for reduction gearing, comprising the combination of a driving shaft, sleeve elements on said shaft and secured thereto at the outside end portions the remainder of said sleeves being spaced from said shaft, thereby providing flexible portions, said flexible portions being each provided with a pinion portion, and reciprocally movable bearing means for said sleeve elements.

15. A reduction gear pinion device, comprising a driving shaft, a plurality of flexible sleeves having pinion portions connected to said shaft, and relatively movable bearings for said sleeves.

16. A reduction gear pinion device, comprising a driving shaft, a plurality of sleeve members on said shaft and secured at the outside ends to said shaft the juxtaposed inner portions of said sleeves being spaced from said shaft and each having a pinion portion, pivoted supporting means, and bearing members for said sleeves pivoted to said supporting means.

17. In a gear set, a pinion divided into a plurality of parts, flexible driving means for said parts, and a separate floating frame for each of said parts.

In testimony whereof, I have hereunto subscribed my name this 14th day of September, 1918.

RAYMOND N. EHRHART.